July 24, 1923.
W. SIEBERT
1,462,987
PROCESS FOR PRODUCING NITRIC ACID BY MEANS OF THE ELECTRIC ARC
Filed May 13, 1922
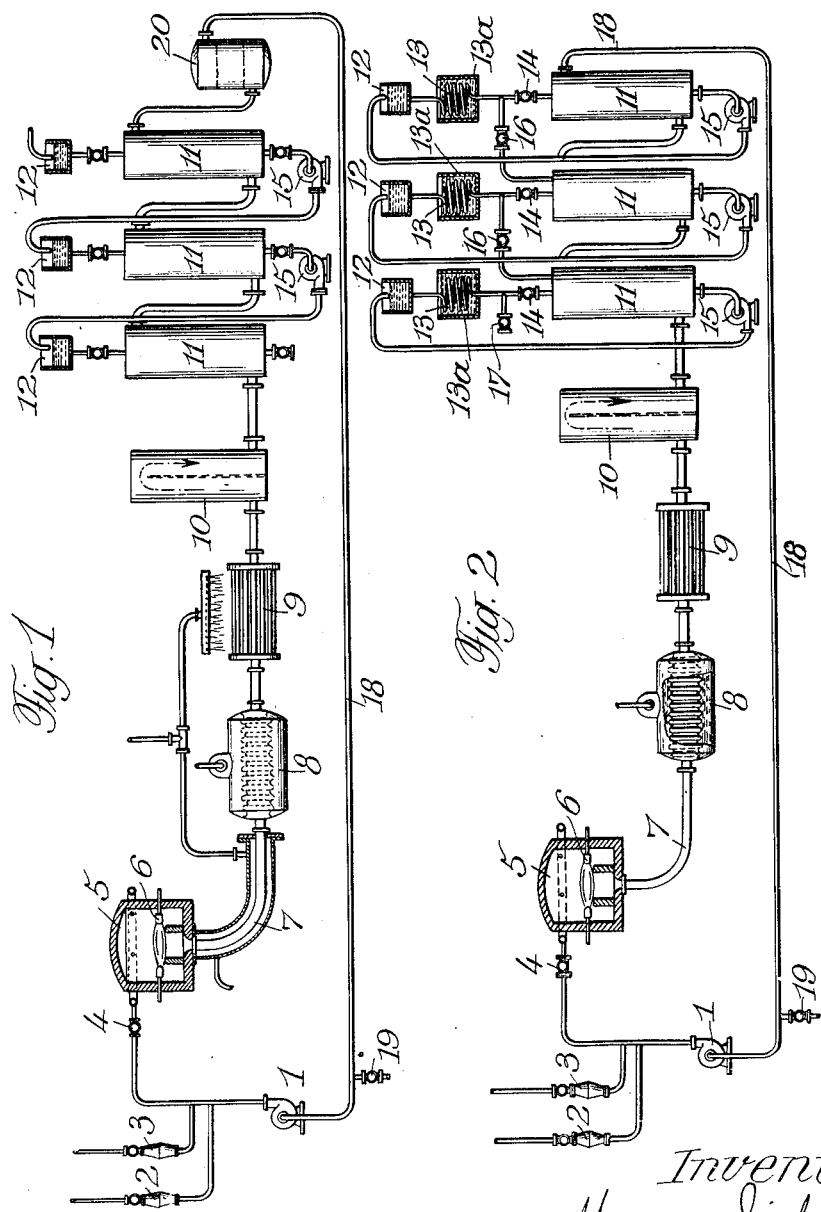

Patented July 24, 1923.

1,462,987

UNITED STATES PATENT OFFICE.

WERNER SIEBERT, OF LAUFENBURG, AARGAU, SWITZERLAND, ASSIGNOR TO NITRUM AKTIENGESELLSCHAFT, OF ZURICH, SWITZERLAND, A CORPORATION OF SWITZERLAND.

PROCESS FOR PRODUCING NITRIC ACID BY MEANS OF THE ELECTRIC ARC.

Application filed May 13, 1922. Serial No. 560,731.

*To all whom it may concern:*

Be it known that I, WERNER SIEBERT, a citizen of the Republic of Germany, residing at Laufenburg, Aargau, Switzerland, have invented certain new and useful Improvements in a Process for Producing Nitric Acid by Means of the Electric Arc, of which the following is a specification, reference being had therein to the accompanying drawing.

It is a known fact based on chemical laws that the oxidation of nitrogen in electric arcs gives a yield which is higher by 25%, if instead of atmospheric air a gas mixture of 50% oxygen and 50% nitrogen is subjected to the action of the arc. Besides this a higher concentration of the nitric fumes is obtained, which facilitates absorption and the production of nitric acid.

Nevertheless the existing plants for producing nitric acid operate on atmospheric air and only the process described hereinafter, which has been thoroughly worked on a commercial scale allows the utilization of a 50% mixture of oxygen and nitrogen and the attainment of the above mentioned advantages. According to the present process the atmospheric air is liquefied and separated by evaporation into oxygen and nitrogen. These gases are introduced into the gas-current, which is led through the electric furnaces, in such quantities that the gas mixture treated is maintained continuously at a concentration of 50% oxygen and 50% nitrogen. The gases leaving the electric furnace are cooled down in a steam generator to a temperature of about 200° C. whereby the heat contained in the gases is conserved. Thereafter the gases are further cooled in heat interchange apparatus influenced by cooling water to a temperature of about 30° C. The gases are then led to absorption towers, which are fed with nitric acid. The gases coming out of the absorption system, which are saturated with moisture, are dried by means of sulfuric acid and are led to a blower, which returns them to the electric furnaces for repeated treatment in a cycle.

The process can be so modified that the absorption of the nitric fumes in the nitric acid towers is performed at a temperature below 0° C., so that the content of moisture in the gases leaving the absorption system is so low that these gases can be conducted back to the electric furnace without any danger of causing corrosion of the iron pipes or other apparatus. As the gases introduced into this circuit, being derived from atmospheric air, always contain small portions of argon, which does not take any part in the reaction of the electric arc and with which therefore the gases performing the cycle are continuously enriched, it is necessary to renew the gas mixture, from time to time, as a higher concentration of argon reduces the efficiency of the combustion in the electric furnaces. Therefore the process has been improved by letting continuously a certain amount of gas escape corresponding to about one-fourth of the gas quantity, which is introduced into the circuit as pure nitrogen and oxygen. If for instance 400 cubic meters of nitrogen and oxygen containing 0.7% argon, i. e. 2.8 cubic meters argon, are introduced into the circuit per hour, and 100 cubic meters of the gas mixture are led off at another point of the circuit, it is possible to maintain the concentration of argon at about 2.8%, i. e. a concentration which has no harmful effect on the formation of nitric oxides. In the drawings Fig. 1 is a diagrammatic sketch of an installation for carrying out the invention; and Fig. 2 illustrates a modified form of an installation.

Referring to Figure 1, the gases coming out of the absorption system are led through a conduit to the rotary blower 1, by which they are raised to the desired pressure and delivered to the electric furnace 5. 2 and 3 are gas meters of the nozzle type, through which the pure oxygen and nitrogen pass into the conduit leading to the electric furnace 5. 4 denotes a valve, which allows regulation of the gas-current. 6 are the electrodes of the furnace between which the arc is generated. 7 is a jacketed cooling-pipe, which allows the abrupt cooling of the gases as they leave the furnace in order to avoid the decomposition of the obtained nitric oxid. 8 is a steam generator, in which the gases are cooled down to about 200° C. and in which the heat contained in the gases is conserved in the generation of a large amount of steam, which can be utilized for the concentration of dilute nitric acid or for other purposes. 9 denotes a water cooler adapted to further cool the gases. 10 is a chamber, in which the nitrogen monoxide (NO) is oxidized into nitrogen peroxide ($NO_2$). 11 are the absorption towers, which are fed from the tank 12 with dilute nitric acid or with water. 20 denotes an absorption tower of iron, in which the gases are brought into contact with sulphuric acid and in which the moisture contained in the gases is absorbed by this acid. This drying of the gases is necessary to prevent the formation of nitric acid in the electric furnace, which would take place if the moisture should come into contact with the nitric fumes formed in the electric furnaces, the so formed nitric acid would corrode the apparatus situated between the furnace 5 and the oxidation chamber 10. 18 is a conduit leading the gases from the sulphuric acid tower 20 to the blower 1. 19 denotes a valve allowing the escape of a portion of the gases from the system and the maintenance of the contents of argon at a low percentage. It is seen from the above, that the gases are led in a closed circuit through the furnace, the steam generator, the water cooler, the oxidizing chamber, the absorption towers, the drying tower and back to the furnace. The nitric fumes produced in the furnace are absorbed in the absorption towers to form nitric acid and through the gas meters 2 and 3, an amount of oxygen and nitrogen is introduced into the circuit corresponding to the amount that has been taken out from the apparatus in form of nitric acid and that has escaped through the valve 19. It is advantageous to lead the gas escaping through the valve 19 into the nitrogen and oxygen separating apparatus, as this gas contains already 50% oxygen and it is therefore easier and cheaper to gain out of this gas pure oxygen, than if oxygen has to be gained from atmospheric air.

In the modified system, illustrated in Figure 2 the gases are dried in a different manner to that described above. In this modified installation the gases leaving the oxidation chamber 10 are led to similar absorption towers 11 as in the previously described installation. These towers are fed in contradistinction to the installation shown in Figure 1 with dilute nitric acid, which is cooled down to such a low temperature, that the gases coming out of the last absorption tower are dried to such a degree, that the gases can be led back to the electric furnace 5 without affecting the intermedial apparatus in any harmful manner. To arrive at this cooling effect, a nitric acid pump 15 is connected to each absorption tower 11, which pump lifts the acid leaving the towers into a tank 12. From this tank the nitric acid flows through a cooling coil 13, which is placed in a tank 13ª, in which brine at a temperature of —25° C. circulates. Thence the nitric acid flows back through valve 14 into the absorption towers 11. The portion of this acid however, which is small in comparison with the amount of acid produced from nitric gases in the tower 11, is led through valve 16 to the following absorption tower 11. In this tower 11 the process is repeated as is also the case in the third tower shown in Fig. 2. The nitric acid obtained in this last tower, through which the nitric gases of highest concentration are led, has the highest concentration, for instance 60% $HNO_3$. The nitric acid formed in the absorption system can be drawn off from valve 17. The great advantage of the above described process is, that the whole circuit can be kept under pressure or under slight vacuum as desired by regulating the blower 1. Losses of any kind of nitric gases are absolutely impossible. Not only are by this process all nitric gases, formed by the electric arc, absorbed and recovered, but also nitric oxides of a higher concentration are obtained in using the oxygen-nitrogen gas mixture. Further the oxidation of NO into $HNO_3$ takes place very rapidly, owing to the high percentage of oxygen in the gas mixture which is not the case when air alone is utilized. It is therefore possible to draw from the absorption tower, through which the nitric gases are passed through first, a nitric acid of 60% $HNO_3$, whereas with the process known and applied up to the present, a nitric acid of only 35% has been obtained.

The result is, that with the present invention it is possible to get a yield of 80 grammes of $HNO_3$ per kilowatt-hour or 700 kilogram of $HNO_3$ per kilowatt year.

I claim:

1. The cyclical process of producing nitric acid by means of the electric arc which consists in treating a nitrogen-oxygen mixture in an electric arc furnace, cooling abruptly the gases leaving said electric arc furnace and conserving the heat contained in said gases, absorbing the nitric oxides thus formed by nitric acid in absorption towers, leading the non-absorbed portion of the gases after a treatment adapted to keep their content of moisture below a determined limit back into the electric arc furnace, and feeding pure oxygen and nitrogen continuously in such quantities to the returned gas-mixture that the gas-mixture treated in the furnace contains 50% of oxygen and 50% of nitrogen.

2. The cyclical process of producing nitric acid by means of the electric arc which consists in treating a nitrogen-oxygen mixture in an electric arc furnace, cooling abruptly the gases leaving said electric arc furnace and conserving the heat contained in said gases, absorbing the nitric oxides thus formed by means of nitric acid in absorption towers, subjecting the non-absorbed gases to a treatment causing their content of moisture to be below a determined limit and returning said gases for a repeated treatment to the electric furnace, feeding pure oxygen and nitrogen continuously in such quantities to the returned gas-mixture that the gas-mixture treated in the furnace contains 50% of oxygen and 50% of nitrogen, and maintaining a pressure slightly below atmospheric in the system to prevent any loss of nitric oxid gases.

3. The cyclical process of producing nitric acid by means of the electric arc which consists in treating a nitrogen-oxygen mixture in an electric arc furnace, cooling abruptly the gases leaving said electric arc furnace and conserving the heat contained in said gases, absorbing the nitric oxides thus formed by means of nitric acid in absorption towers, and maintaining a low temperature in the latter to keep the moisture in the non-absorbed gases below a determined limit, returning said non-absorbed gases for a repeated treatment to the electric arc furnace, and feeding pure oxygen and nitrogen continuously in such quantities to the returned gas-mixture that the gas-mixture treated in the furnace contains 50% of oxygen and 50% of nitrogen.

4. The cyclical process of producing nitric acid by means of the electric arc which consists in treating a nitrogen-oxygen mixture in an electric arc furnace, cooling abruptly the gases leaving said electric arc furnace and conserving the heat contained in said gases, absorbing the nitric oxides thus formed by means of nitric acid in absorption towers, and maintaining a low temperature in the latter to keep the moisture in the non-absorbed gases below a determined limit, returning said non-absorbed gases for a repeated treatment to the electric arc furnace, and feeding pure oxygen and nitrogen continuously in such quantities to the returned gas-mixture that the gas-mixture treated in the furnace contains 50% of oxygen and 50% of nitrogen and that one quarter of the gas-mixture passing through the furnace can continuously be discharged to avoid an accumulation of argon that exceeds a determined percentage.

5. An installation for producing nitric acid by means of the electric arc comprising in combination an electric arc furnace, means to force a nitrogen-oxygen mixture through said furnace, heat interchange means adapted to abruptly cool the gas-mixture leaving said furnace and to conserve the heat contained in said gases, absorption towers adapted to absorb nitric oxides formed, means adapted to keep the content of moisture in the non-absorbed gases below a determined limit, means to maintain a circulation in the system and adapted to return said nonabsorbed gases for a repeated treatment to said furnace, and means adapted to introduce pure oxygen and nitrogen in such quantities into said returned gases that the gas-mixture treated in said furnace contains 50% of oxygen and 50% of nitrogen.

6. An installation for producing nitric acid by means of the electric arc comprising in combination an electric arc furnace, means to force a nitrogen-oxygen mixture through said furnace, heat interchange means adapted to abruptly cool the gas-mixture leaving said furnace and to conserve the heat contained in said gases, absorption towers adapted to absorb nitric oxides formed, means adapted to keep the content of moisture in the non-absorbed gases below a determined limit, means to maintain a circulation in the system and adapted to return said nonabsorbed gases for a repeated treatment to said furnace means adapted to introduce pure oxygen and nitrogen in such quantities into said returned gases that the gas-mixture treated in said furnace contains 50% of oxygen and 50% of nitrogen, and means adapted to maintain a pressure slightly below atmospheric in the system to prevent any loss of nitric oxid gases.

7. An installation for producing nitric acid by means of the electric arc comprising in combination an electric arc furnace, means to force a nitrogen-oxygen mixture through said furnace, heat interchange means adapted to abruptly cool the gas-mixture leaving said furnace and to conserve the heat contained in said gases, absorption towers adapted to absorb nitric oxides formed, means adapted to maintain in said absorption towers a temperature below 0° C. to keep the content of moisture in the non-absorbed gases below a determined limit, means to maintain a circulation in the system and adapted to return said nonabsorbed gases for a repeated treatment to said furnace, and means adapted to introduce pure oxygen and nitrogen in such quantities into said returned gases that the gas-mixture treated in said furnace contains 50% of oxygen and 50% of nitrogen.

8. An installation for producing nitric acid by means of the electric arc comprising in combination an electric arc furnace, means to force a nitrogen-oxygen mixture through said furnace, heat interchange means adapted to abruptly cool the gas-mixture leaving said furnace and to conserve the heat contained in said gases, absorption towers adapted to absorb nitric oxides formed, means adapted to maintain in said absorption towers a temperature below 0° C. to keep the content of moisture in the non-absorbed gases below a determined limit, means to maintain a circulation in the system and adapted to return said non-absorbed gases for a repeated treatment to said furnace, means adapted to introduce pure nitrogen and oxygen in such quantities into said returned gases that the gas-mixture treated in said furnace contains 50% of oxygen and 50% of nitrogen, and means to permit of a continuous discharge of one quarter of the gas mixture passing through the furnace to avoid an accumulation of argon that exceeds a determined percentage.

In testimony whereof I affix my signature.

DR. WERNER SIEBERT.